Patented Apr. 16, 1935

1,997,719

UNITED STATES PATENT OFFICE 1,997,719

HYDROXYETHYLDIHYDROCUPREINE AND SALTS

Leonard H. Cretcher and William L. Nelson, Pittsburgh, Pa., assignors to Mellon Institute of Industrial Research, a corporation of Pennsylvania No Drawing. Application September 25, 1933, Serial No. 690,946

3 Claims. (Cl. 260—26)

This invention consists in a new compound: hydroxyethyldihydrocupreine, together with its compounds. The accepted formula of hydroxyethyldihydrocupreine is this,—

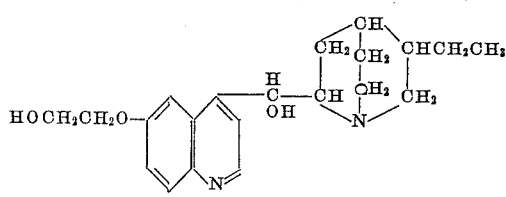

Following is a description of preparation:

Quinine sulphate was reduced to dihydroquinine and the latter was demethylated to dihydrocupreine, in accordance with the procedure of Heidelberger and Jacobs (Jour. Am. Chem. Soc. 1919, XLI, 817). 1.84 gm. of sodium (.08 mole) was dissolved in 100 cc. of absolute alcohol and 24.96 gm. of dihydrocupreine (.08 mole) was dissolved in the warm alcohol. 8.40 cc. of freshly distilled chlorethylvinyl ether (chlorethylvinyl ether has been observed to polymerize slowly on standing at room temperature) was added and the solution was heated in a sealed tube for 22 hours at 92–94° C. The cooled solution was poured into 200 cc. of dilute hydrochloric acid (containing 30 cc. of conc. HCl) and the aqueous solution was extracted twice with ether. The base was precipitated by the slow addition of an excess of ten per cent. sodium hydroxide in a large separatory funnel and extracted twice with ether. The ethereal solution was washed with water and extracted with 200 cc. of dilute hydrochloric acid (containing 15 cc. conc. HCl). The base was again precipitated with an excess of ten per cent. sodium hydroxide and extracted with ether by long continued shaking. A residue insoluble in both alkali and ether was rejected. The ethereal solution was washed with water and extracted with 200 cc. dilute hydrochloric acid (15 cc. of conc. HCl). The base was precipitated for the third time with alkali and allowed to stand until the gummy precipitate settled out. The mother liquor was decanted and the precipitate was washed several times with water by decantation. The gummy base was allowed to dry in a warm place for several days until it could be powdered. It was then dissolved in absolute alcohol and 2N alcoholic hydrochloric acid was added until the solution was acid to Congo red. The solution was allowed to stand in the cooler until precipitation was complete and was then filtered. The mother liquor was evaporated at a low temperature under reduced pressure to somewhat less than half the original volume and an additional amount of the hydrochloride was obtained. The air-dried salt weighed 9.3 gm. The hydrochloride was dissolved in water and the base was precipitated with dilute ammonia. The air-dry base weighed 6.9 gm. The dry base was crystallized from dry acetone at 0° with some difficulty, due to the formation of a gummy precipitate, which, however, was redissolved in acetone and yielded a crystalline precipitate. After a third crystallization the yield was 3.3 gm.

The crystal form of the base could not be ascertained. It fuses between 105° and 112° C. on fairly rapid heating. .2357 gm. in 10.08 cc. absolute alcohol gave an optical rotation of $-3.09°$ in a 1 dm. tube.

$$[\alpha]_D^{23} = -132.1°.$$

Hydroxyethyldihydrocupreine is found to have bacteriacidal value; and, more specifically, pneumococcocidal value; and this with low toxicity. We have reason to believe that it may be administered without producing in the patient those visual and auditory disturbances that are produced by ethyldihydrocupreine (optochine).

The substance itself is not water-soluble, and, though it may be assimilated after undergoing reaction by the gastric juices, compounds of the substance may be prepared; and certain of them, being water-soluble, are more readily serviceable for the uses indicated, whether for internal or external application. Among such compounds, the di-hydrochloride has been prepared and tested and found suitable.

The di-hydrochloride was prepared from the crystalline base in a solution of absolute alcohol by the addition of HCl, in the manner described above. Dry ether was added to incipient crystallization and the solution cooled until crystallization was complete. The salt was filtered, washed with ether, and recrystallized from absolute alcohol in the same manner. White needles, melting with decomposition at 234°. 0.1051 gm. of dried (over $P_2O_5$) salt in 10.08 cc. absolute alcoholic solution had an optical rotation of $-1.34°$ in a 1 dm. tube.

$$[\alpha]_D^{23} = -128.5°.$$

Analysis.—Calculated for $C_{21}H_{30}O_3N_2Cl_2$: C, 58.71; H, 7.05; N, 6.53; Cl, 16.52. Found: C, 58.46, 58.66; H, 7.02, 7.17; N, 6.40, 6.36; Cl, 16.38, 16.39.

Among other compounds we have prepared the acetate, by heating the base with acetic anhydride. We have not, however, produced the acetate in crystalline condition.

Among other esters, we have prepared benzoyl hydroxyethyldihydrocupreine sulfate by heating hydroxyethyldihydrocupreine with benzoyl chloride according to the method of Wunsch (Ann. Chem. phys. 1896, VII, 125). It was not obtained in crystalline condition; hence it was converted to the neutral sulfate in alcoholic solution by adding normal sulfuric acid until the solution was acid to litmus. The salt was precipitated with ether and recrystallized from alcohol and ether in the same manner. White needles melting with decomposition at 231°. 0.0229 gm. in 3.017 cc. of 95 per cent alcoholic solution had an optical rotation of —0.80° in a 1 dm. tube.

$$[\alpha]_D = -105.4°.$$

*Analysis.*—The analysis shows that the monobenzoate instead of the expected dibenzoate was obtained. Calculated for $$C_{28}H_{33}O_6N_2\tfrac{S}{2}:$$

N, 5.49; S, 3.14. Found: N, 5.40, 5.36; S, 3.29, 3.24.

We know no limitation upon the production of other particular compounds by following established methods of procedure.

We claim as our invention:

1. As a new compound, hydroxyethyldihydrocupreine.

2. As a new compound, hydroxyethyldihydrocupreine di-hydrochloride.

3. A compound selected from the group consisting of

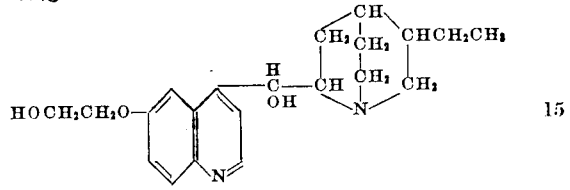

and its salts.

LEONARD H. CRETCHER.
WILLIAM L. NELSON.